(12) United States Patent
Farrington

(10) Patent No.: US 6,201,723 B1
(45) Date of Patent: Mar. 13, 2001

(54) SIMPLIFIED CURRENT SHARE CIRCUIT

(75) Inventor: Richard Farrington, Heath, TX (US)

(73) Assignee: Ericsson Inc., Richardson, TX (US)

(*) Notice: Subject to any disclaimer, the term of this patent is extended or adjusted under 35 U.S.C. 154(b) by 0 days.

(21) Appl. No.: 09/429,827

(22) Filed: Oct. 29, 1999

(51) Int. Cl.[7] .................................................. H02M 1/00
(52) U.S. Cl. ................................. 363/147; 363/71; 363/65
(58) Field of Search ........................... 363/147, 131, 363/132, 71, 72, 65; 323/271, 272

(56) References Cited

U.S. PATENT DOCUMENTS

| 5,428,523 | * | 6/1995 | McDonnal | 363/71 |
| 5,724,237 | * | 3/1998 | Hunter | 363/65 |

* cited by examiner

Primary Examiner—Peter S. Wong
Assistant Examiner—Rajnikant D. Patel
(74) Attorney, Agent, or Firm—Arthur I. Navarro

(57) ABSTRACT

A current sharing circuit scheme comprising first and second power modules (36,38) each including an input side (30) and an output side (32), the power modules (36, 38) coupled to each other via respective input sides (30), each of the output sides (32) including a positive terminal and a negative terminal. The circuit scheme also comprises first and second circuit output voltage terminals (47, 46) and first and second set point controls (40, 41) coupled to the negative terminal of each of the output sides (32). First and second initial set point controls (42,45) are included providing current signal paths between corresponding first and second set point controls (40, 41) and the first output voltage terminal (47). The first and second set point controls (40, 41) and the first and second initial set point controls (42, 45) are configured to allow current sharing through said first and second circuit output voltage terminals (47, 46) when a current signal is applied to said input side (30) of said first and second power modules(36,38).

17 Claims, 7 Drawing Sheets

SIMPLIFIED CURRENT SHARE CIRCUIT

TECHNICAL FIELD

This invention relates generally to distributed power applications and systems, and more particularly, to a current sharing technique using DC-to-DC power modules suitable for use in such applications and systems where parallelability and current sharing are required.

BACKGROUND

The powering requirements of new computer and communications systems continue to require increased flexibility and performance. Increased system flexibility has resulted in increased interest in distributed power architectures. A fundamental requirement for distributed systems is module parallelability and current sharing.

Many different current share techniques have been suggested over the years to parallel multiple power supplies. In most cases, these schemes measure the current provided by each module, amplify it, compare it to the current form of other modules, and adjust the regulation voltage of its own module so as to minimize the difference in the output currents between modules. Many different variations of this technique have been suggested and implemented in industry. See Zhou, X., Peng, X., and Lee, F. C., "A high power density, high efficiency and fast transient voltage regulator module with a novel current sensing and current sharing technique", IEEE APEC 99 Proceedings, pp. 289–294; Petruzziello, F., Ziogas, P. D., and Joss, G., "A novel approach to paralleling of power converters units with true redundancy", IEEE PESC 90 Proceedings, pp. 808–813; Small, K. T., "Single wire current share paralleling of power supplies", U.S. Pat. No. 4,717,8333, 1988; Jordan, M., "Load share IC simplifies power supply design", High Frequency Power Conversion Conf. Proc., pp. 65–76, 1991; Jordan, M., "UC3907 load share IC simplifies parallel power supply design", Application Handbook Unitrode, pp. 3-203–3-212 (U-129), 1997; Balogh, L., "The UC3902 load share controller and its performance in distributed power systems", Application Handbook Unitrode, pp. 3-626–3-633 (U-163), 1997; Jamerson, C., Mullet, C., "Paralleling supplies via various droop methods", High-Frequency Power Conversion Conf. Proc., pp. 68–76, 1994.

There are two widely used solutions of implementing current sharing modules in industry today. The first solution is the droop method. In this method, the system output voltage is allowed to droop as the load current increases, resulting in improved current sharing. The droop method works well if the initial set point of the different modules is relatively similar. However, there are systems which do not permit the voltage to droop.

The second solution, active current sharing, is generally used in these systems. In active current sharing, the individual current of each parallel module is measured, amplified, and compared to each other. Based on the result of this comparison, the module set point is adjusted to drive the difference between the output currents of each module to zero. Many different implementations of active current sharing are being used in industry today. Generally, active current sharing requires the use of several operational amplifiers.

Although the droop method and active current sharing are widely used in industry, each has disadvantages that involve either high cost, increased size, complexity, or decreased system performance. The droop method offers a simple and cost effective solution at the expense of system performance. Active current sharing, on the other hand, produces high performance but must be implemented with complex, costly, and power dissipating circuitry. Thus, what is needed is a cost effective and less complex current share circuit which does not decrease system performance nor significantly increase the physical size of the system.

SUMMARY OF THE INVENTION

The present invention achieves technical advantages as a simplified current share circuit scheme for multiple power modules. The invention provides cost efficient and less complex circuitry than the prior art. The present invention may be adapted for use with power modules which are not designed for current sharing.

In one embodiment of the present invention, disclosed is a current sharing circuit scheme comprising a first and second power module. Each module includes an input side and an output side with the power modules coupled to each other via respective input sides. Each of the output sides include a positive terminal and a negative terminal. The circuit scheme also comprises first and second circuit output voltage terminals and first and second set point controls coupled to the negative terminal of each of the output sides. A first and second initial set point control is included providing current signal paths between the corresponding first and second set point controls and the first output voltage terminal. The first and second set point and the first and second initial set point controls are configured to allow current sharing through said first and second output voltage terminals when a current signal is applied to said input side of said first and second power modules.

The embodiment of the present invention as set forth above, may be adapted to more precisely handle the variations in the output voltage. Regulation terminals are coupled between the first and second power modules and the negative terminal of said circuit output voltage terminal to maintain the initial set point of the first and second power modules. Regulation terminals are also added between the first and second power module output sides and the other module's trim terminal such that the voltage across the first output terminal is controlled relative to the voltage across the circuit output voltage terminal to facilitate current sharing.

The present invention may be adapted to facilitate current sharing between three power modules. Various embodiments are also included to facilitate current sharing under conditions including mismatched system impedances.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF THE PREFERRED EMBODIMENTS

The following is a description of the structure and method of the present invention. A prior art circuit will be discussed first, followed by a description of several preferred embodiments and alternatives of the present invention, and a discussion of the advantages.

Figure 1:
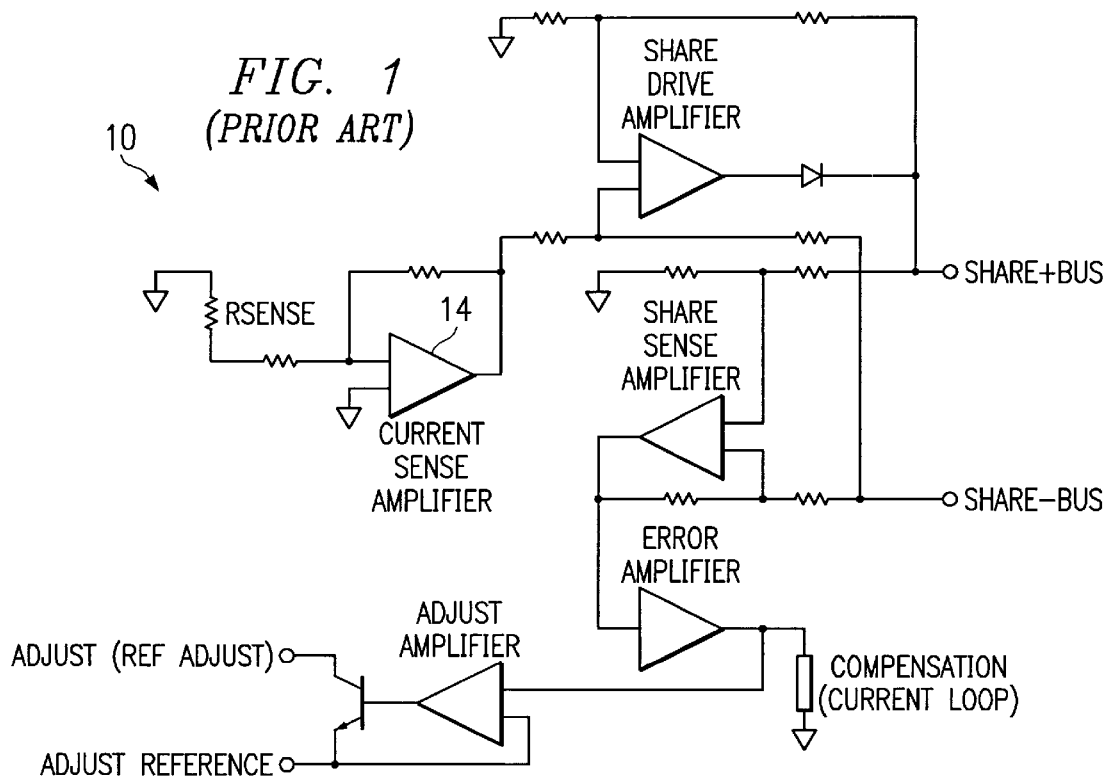
FIG. 1 is a typical current share circuit with a two wire current share bus.

A typical implementation of a circuit 10 used for active current sharing is shown in FIG. 1. The circuit 10 is utilized for active current sharing between a plurality of power modules 16 (shown in FIG. 2). The current supplied by each of a plurality of power modules 16 is measured in the sense resistor Rsense. This signal is amplified in the current sense amplifier 14. A signal proportional to the sense current is developed across the current share bus represented by "share+bus" and "share−bus", compared to the signal coming from the other power modules 16, and, finally, adjustment is made depending on whether the current being delivered by the module is high or low. The adjusting signal is usually injected into the voltage loop of the power module 16 so as to adjust its regulation point. This is a very elegant solution to the problem. Many different variations of active current sharing have been suggested and implemented in industry and may be used with DC-to-DC power modules 16.

Figure 2:
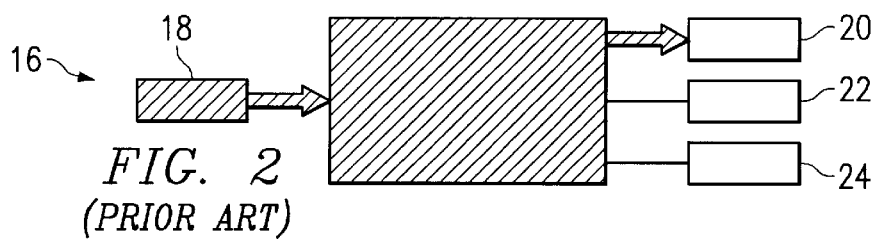
FIG. 2 is a block diagram of a typical DC-to-DC board mounted power module.

A typical power module 16 that may be used in a current share circuit is shown in FIG. 2. The power module 16 comprises an input terminal 18, output terminal 20, a voltage sense terminal 22, and a trim terminal 24. The current enters the power module 16 through the input terminal 18 and is measured and amplified as necessary. The difference between the output and voltage sense terminals 20 and 22 can be used to provide information regarding the load current. This information is used, in turn, to adjust the trim terminal 24 which controls the voltage across the output terminal 20. Thus, this configuration allows for the current of a power module 16 to be compared to that of another module. The result is a system of two or more power modules 16 current sharing.

Figure 3:
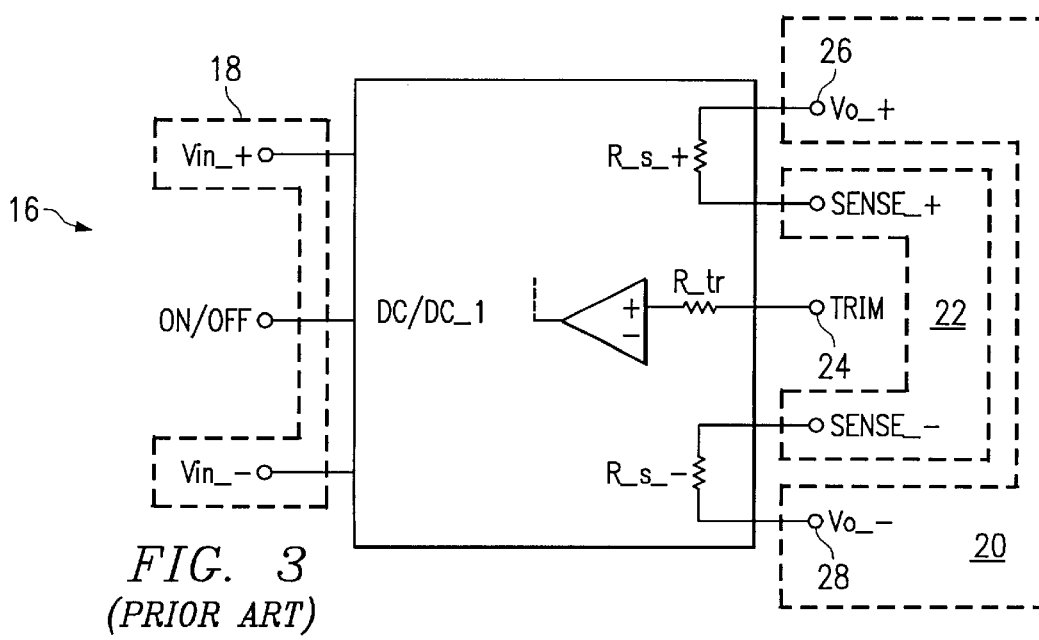
FIG. 3 is a simple circuit diagram of a typical DC-to-DC board mounted power module.

In the more detailed circuit diagram of the power module 16, shown in FIG. 3, the input and output terminal 18 and 20, respectively, are pins which are used to integrate the power module 16 into the current share circuit. An on/off pin is also included to turn the power module on and off. The voltage sense terminal 22 and trim terminal 24 are also pins. The voltage sense terminal 22 comprises a positive and negative sub-terminal 26 and 28, respectively. The voltage sense terminal 22 positive and negative sub-terminals 26 and 28 allow the power module 16 to regulate the correct system voltage. This is accomplished by providing the load current information to the trim terminal 24 which is used to adjust the output voltage of the power module 16.

The output voltage of the power module 16 and the regulated system voltage are not the same. The difference between these two voltages varies depending on the load current. The larger the load current the greater the difference between these two voltages. The output voltage of the power module 16 is always greater than the regulated system voltage. A positive signal into the trim terminal 24 adjusts the output voltage of the module to a higher voltage relative to its initial set point. A negative signal into the trim terminal 24 adjusts the output voltage to a lower voltage.

The present invention, a simplified current share circuitry, utilizes power module 16 to minimize system cost without degrading the performance of the current share system. Current sharing within 10% can be easily obtained. The present invention does away with the current share bus as shown in FIG. 1 or any additional op-amps. Furthermore, because of its simplicity, this current share technique can be implemented in existing DC-to-DC power modules 16 that are not designed for current sharing.

Figure 4:
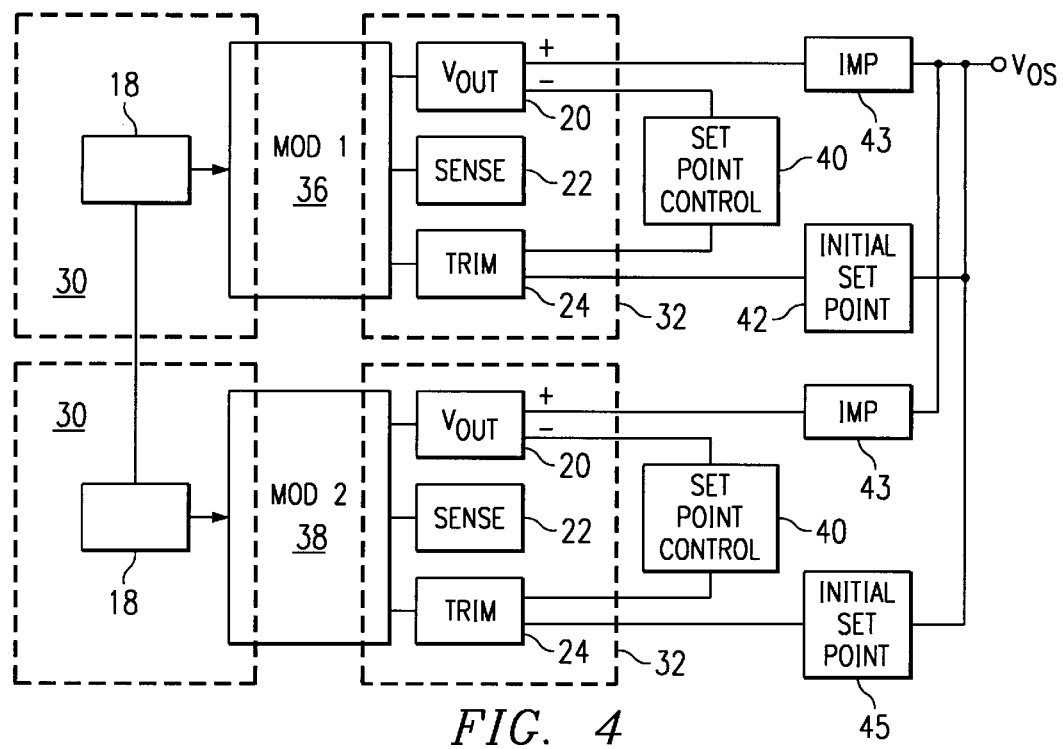
FIG. 4 is a block diagram of one embodiment of the present invention having two current sharing power modules.

FIG. 4 is one embodiment of the present invention having a first and a second power module, 36 and 38, respectively. The first and second power modules comprise an input side 30 and an output side 32. The first and second modules 36 and 38 are coupled together via the respective input sides 30 utilizing the input terminals 18 included in the input side 30. The output sides 32 are comprised of the output, voltage sense, and trim terminals 20, 22, and 24, respectively, which are used to facilitate current sharing between the first and second power modules 36 and 38. As set forth above, the voltage sense terminal 22 provides information regarding the load current. Therefore, this information can be used accordingly to adjust the trim terminal 24 on each of the first and second power modules 36 and 38 to force the power modules 36 and 38 to current share.

Set point controls 40 and 41 are implemented and coupled to each of the power modules 36 and 38, respectively, to overcome the difference in the output voltage set points of the power modules 36 and 38. The initial set point of each power module 36 and 38 will be maintained by initial set point controls 42 and 45. The natural impedance, indicated by 43, that exists between the output terminal 20 of the power module 16 and the place at which the system voltage is regulated is used as a current sense resistor.

In this embodiment first and second power modules 36 and 38 will current share by what is known as the droop method. As the two module system requires more current, the system voltage will droop. In some applications, a 100 to 200 mV variation in the output voltage is not a problem and the embodiment, as set forth, is more than adequate. In most applications, however, precise regulation of the output voltage is required and a 20 to 200 mV variation in the output voltage can not be tolerated.

Figure 5:
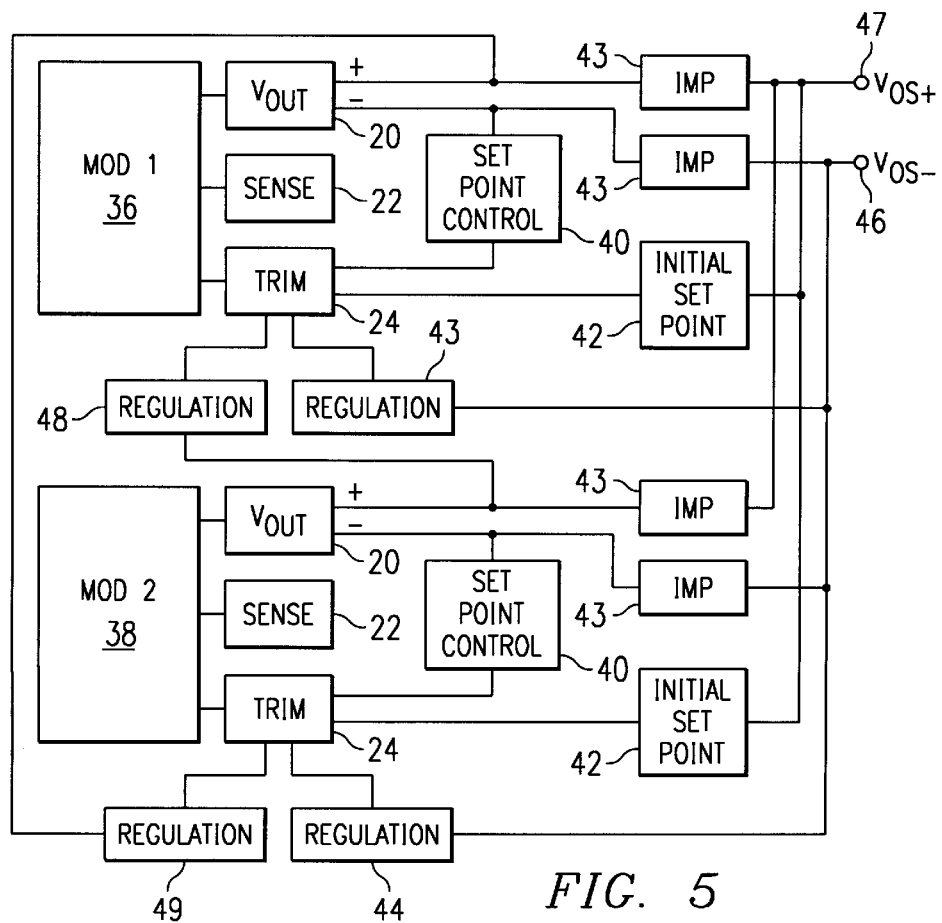
FIG. 5 is a block diagram of another embodiment of the present invention having two current sharing modules.

A second embodiment of the present invention is shown in FIG. 5. This embodiment provides the precise regulation of the output voltage that is required in some applications. A first and third regulation terminal 43 and 44 are included in the second embodiment and are coupled between the trim terminal 24 of the first circuit and second power modules 36 and 38, respectively, and the second circuit output voltage terminal 46. Second and fourth regulation terminals 48 and 49, respectively, must also be implemented between the trim terminal 24 of the first power module 36 and the output terminal 20 of the second power module 38 and between the trim terminal 24 of the second power module 38 and the output terminal 20 of the first power module 36. The second and fourth regulation terminals 48 and 49 will facilitate regulating the voltages such that the first and second power modules 36 and 38 will current share.

Figure 6:
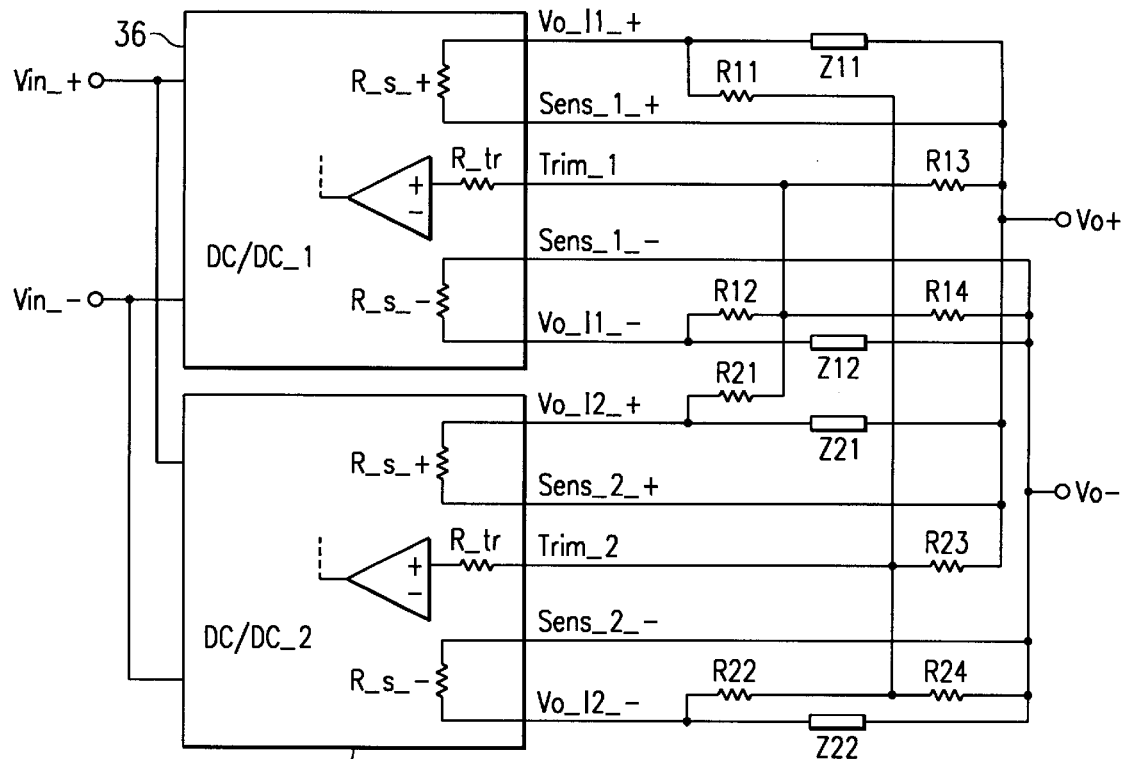
FIG. 6 is a circuit diagram of the embodiment shown in FIG. 5.

A circuit diagram of the present invention combining both embodiments is shown in FIG. 6. In operation, as the load increases the voltage measured at the output terminals 20 of the first and second power modules 36 and 38 will increase relative to the regulated system voltage. Using the first circuit output voltage terminal 47 as a reference, the positive output voltage terminal (Vo_I1_+ and Vo_I2_+) of each power module 36 and 38 will increase relative to the positive system output voltage (Vo+) and the negative output voltage terminal (Vo_I1_− and Vo_I2_−) of each power module 36 and 38 will decrease relative to the negative system output voltage (Vo−).

Therefore, if resistors R12 and R22 are coupled from the trim terminal 24 to the negative output voltage terminal (Vo_I1_− and Vo_I2_−) of each power module 36 and 38 and resistors R13 and R23 are coupled from the trim terminal 24 to the first circuit voltage output terminal 47, as the power modules 36 and 38 deliver more current its output voltage set point will decrease. If this signal is strong enough, differences in the output voltage set points will be overcome and the power modules 16 will current share. The resistors R13 and R23 between the trim terminal 24 and the first circuit voltage output terminal 47 of the first and second power modules 36 and 38 are necessary to retain the initial set point of the power modules 36 and 38. Thus, the set point controls 40 and 41 and initial set point controls 42 and 45 can be implemented with resistors.

In addition to the two sets of resistors R12, R22 and R13, R23 that were implemented as the set point and initial set point controls 40, 41, 42 and 45 terminal 24 a resistor R21 connected from the trim terminal 24 of the first power module 36 to the Vo_I2_+ terminal of the second power module 38 and a resistor R14 from the trim terminal 24 of the first power module 36 to the second voltage output terminal 46 need to be added to the first power module 36 as shown in FIG. 6. Resistors R11 and R 24 must also be connected from the trim terminal 24 of the second power module 38 to the Vo_I1_+ sub-terminal of the first power module 36 and from the terminal pin 24 of the second power module 38 to the second voltage output terminal 46.

These added resistors R11, R21, R14, and R24 act as regulation terminals 44. As the second power module 38 tries to deliver more current to the output its local voltage Vo_I2_+ will increase relative to the voltage at the first circuit voltage output terminal 47 raising the voltage in the trim terminal 24 of the first power module 36 forcing the power modules 36 and 38 to current share. If the resistor values are selected correctly so that the signal coming from resistor combination R21 and R14 cancels the DC offset of the signal generated by resistors R12 and R13 the power modules 36 and 38 will current share to a given accuracy without causing the system voltage to droop.

The present invention uses a simplified version of the "droop method" without generating a droop of the system voltage. Generally, a current share implementation using the droop method is regarded as an open loop current system. The present invention injects information regarding its load current and the current from the remaining power modules in the system into the voltage loop. Therefore, this can not be considered an open loop current share system. In some cases, capacitors (not shown) from the trim terminal 24 of each power module 36 and 38 to the local ground might be necessary to insure system stability. These capacitors (not shown) will slow down the current share loop. Computer simulations have been used to confirm the practicality of this technique with good success. Furthermore, resistors R13 and R14 are added not to change the initial set point.

Figure 7:
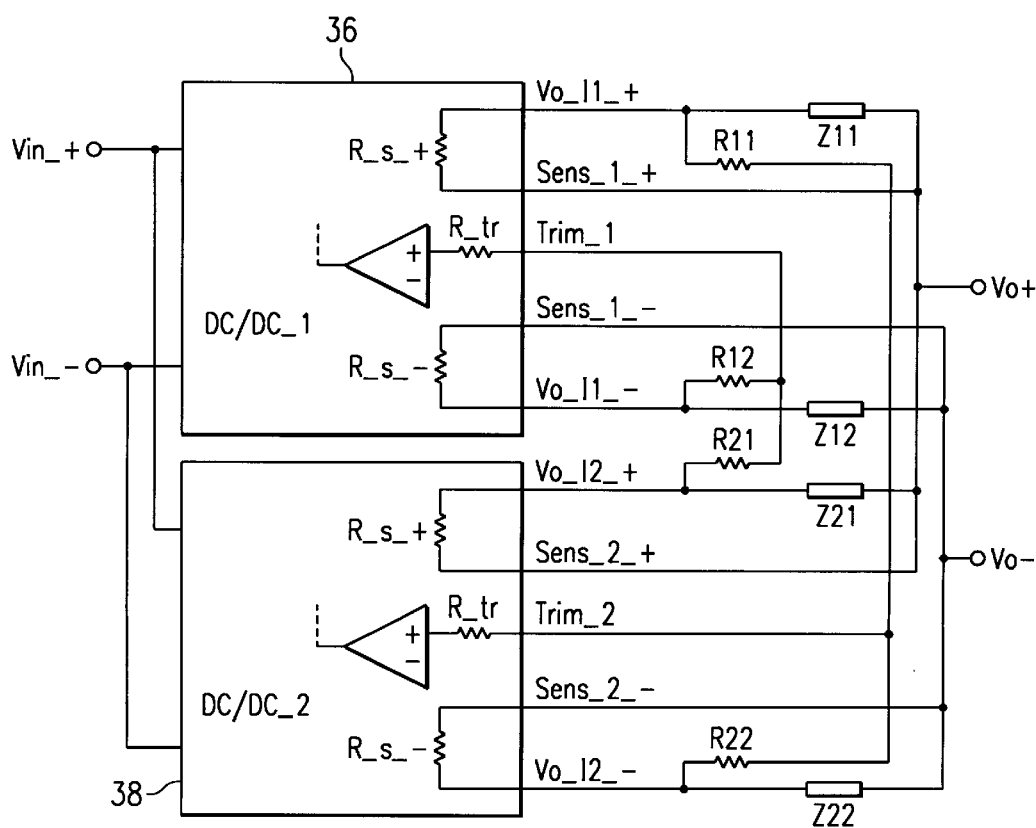
FIG. 7 shows an embodiment of the present invention having two current sharing modules with voltage reference equal to ½ Vo and equal system impedances (Z11=Z12=Z21=Z22)

FIG. 7 shows the simplest embodiment of the present invention current share circuit. In this case Z11=Z12=Z21=Z22 and the internal voltage reference of the first and second power modules 36 and 38 is half the system output voltage. In this case R11=R12=R21=R22. In this scenario, the contribution from R11 is the same as that of R12 as a function of load. Both of these resistors adjust the trim terminal 24 of the first power module 36, so as to force the first and second power modules 36 and 38 to current share, but at the same time maintaining the initial output voltage set point. To improve the correction margin, the value of resistor R_tr and or resistors R11=R12=R21=R22 can be adjusted. The smaller this resistors, the greater the signal that is fed back to correct for discrepancies in the reference, op-amp, etc.

Figure 8:
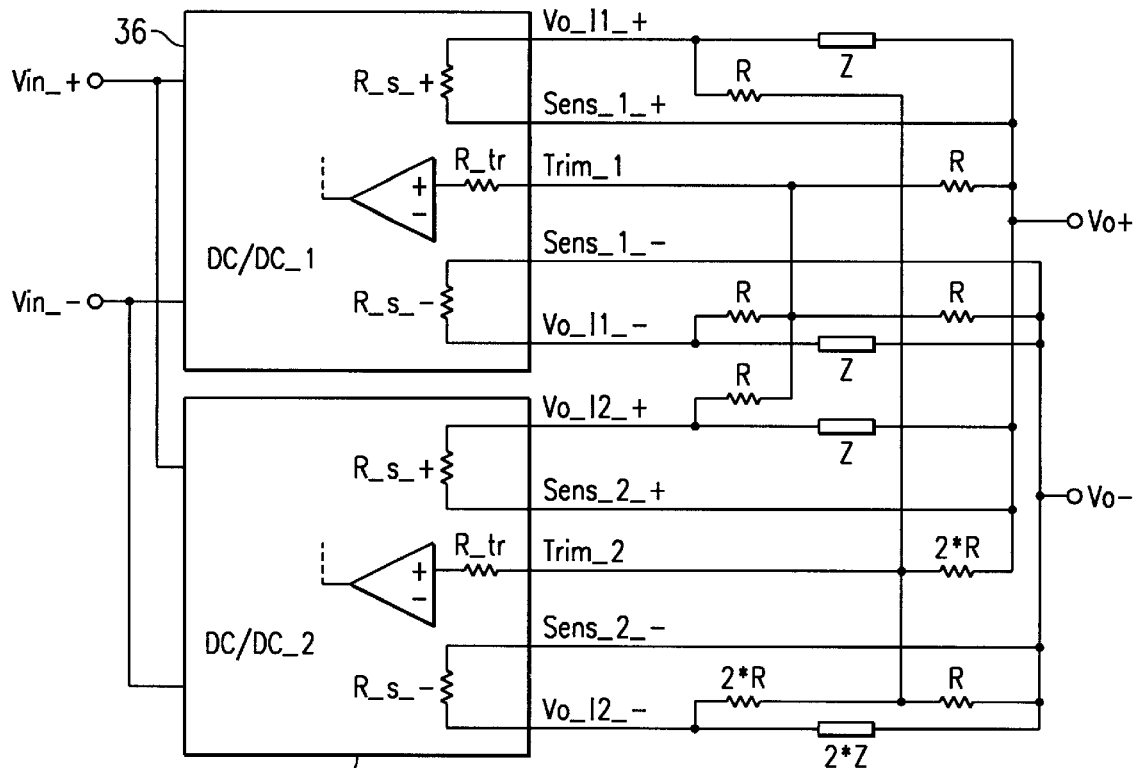
FIG. 8 shows an embodiment of the present invention having two current sharing modules with mismatched impedance.

If one of these two conditions is not true (Z11=Z12=Z21=Z22 and Vref=½ Vo), the circuit implementation for a two power module system reverts back to the one shown in FIG. 6 and the resistor values have to be scaled to make up for the differences. For example, for the case were Z21 is twice Z11=Z12=Z22 resistors R22 and R23 take a value twice that of the remaining resistors as shown in FIG. 8.

The present invention assumes we have knowledge of the system impedance Z11, Z12 . . . etc. since they are indirectly the current sense resistors, and compensation has to be made for their presence. In some applications, the natural system impedance might not be sufficient to correct the initial set point of a plurality of power modules. In this case, an external resistor (not shown) can be added to enhance this impedance and increase the signal level used to current share.

A more complex case occurs when the reference voltage of the first and second power modules 36 and 38 is not half the system output voltage. In this case, the contribution coming from the different resistors have to be selected to take this effect into account. Furthermore, the ratios R11/R24=R13/R12=R21/R14=R23/R22 should be selected so as to maintain the initial set point (output voltage set point).

Figure 9:
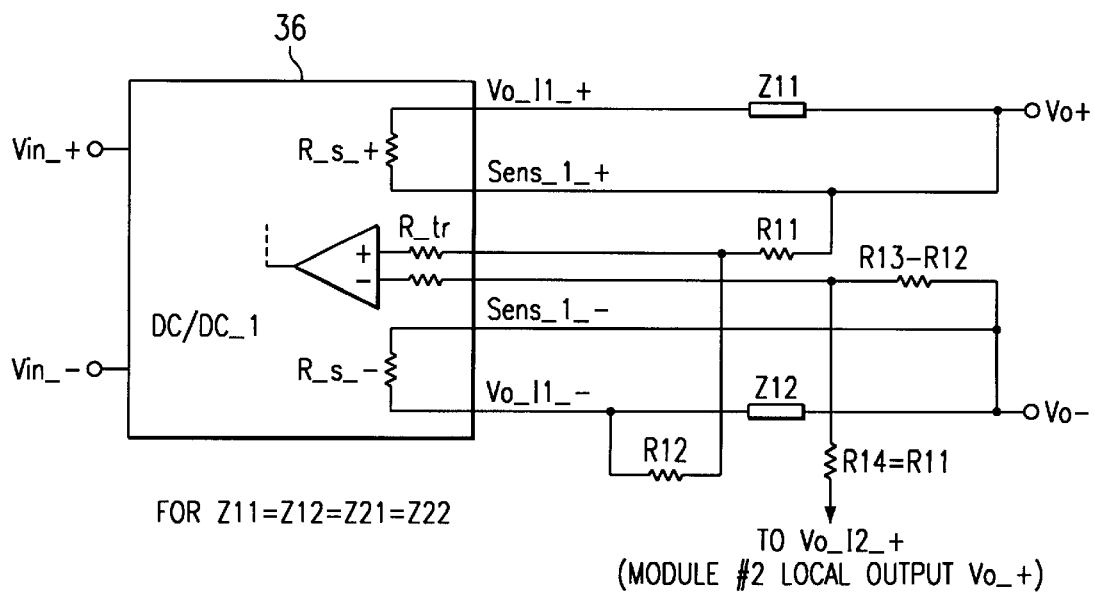
FIG. 9 is another embodiment of the current share circuit of the present invention.

The general idea takes a different configuration if we have access to both pins 50 and 52 of the voltage loop operational amplifier as shown in FIG. 9. FIG. 9 shows the solution for Z11=Z12=Z21=Z22. Having access to both pins of the operational amplifier in the voltage loop removes the ratio between the output voltage and the voltage reference from the equation (the externally added resistors do not have to be selected so as to cancel the effect of a voltage reference not equal to half the output voltage). As in the first configuration, if the system impedances are not equal, then the different resistor networks have to be scaled to cancel the effect of the mismatched impedances. Again, for example, the ratio between R11 and R12 should be such that the initial voltage set point is not changed.

Figure 10:
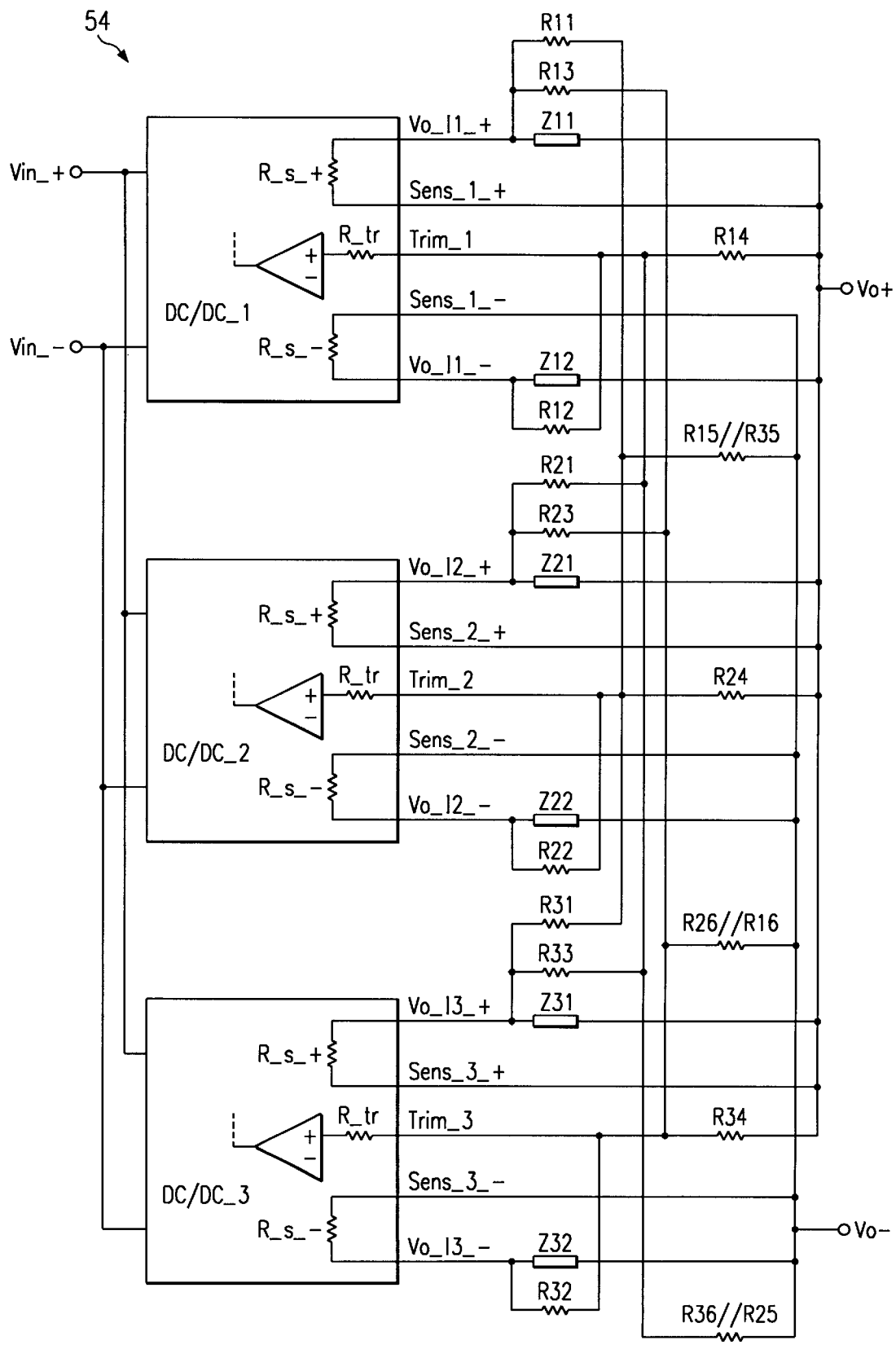
FIG. 10 is an embodiment of the present invention having three current sharing modules.

FIG. 10 shows the configuration for a three-power module system 54. The three-power module system 54 is very similar to the two-power module system. The biggest difference is that in the three power module system 54 there are two modules of the three power module system 54 that inject a signal into the trim terminal 24 with a positive voltage adjust, but only one module of the three power module system 54 that injects a signal with a negative voltage adjust. Therefore, the positive adjust signals have to be scaled down by half so that the positive and negative contributions cancel out removing the load dependence in the system voltage. Again, R14, R26//R16, and R36//R25 should be selected to ensure the externally added resistors will not change the initial set point.

The present invention can also be adapted to modules that do not have voltage sense terminals. In such a case, the absence of a voltage sense terminal causes a droop of the system voltage as a function of the load. This natural droop of the system voltage can be used to obtain a given level of current sharing. Again, in many applications, variations on the system voltage are not desired, therefore, the system designer will try to minimize this effect. Therefore, the present invention can be used to improve the current sharing ability of the system and at the same time correct the system voltage droop.

Figure 11:
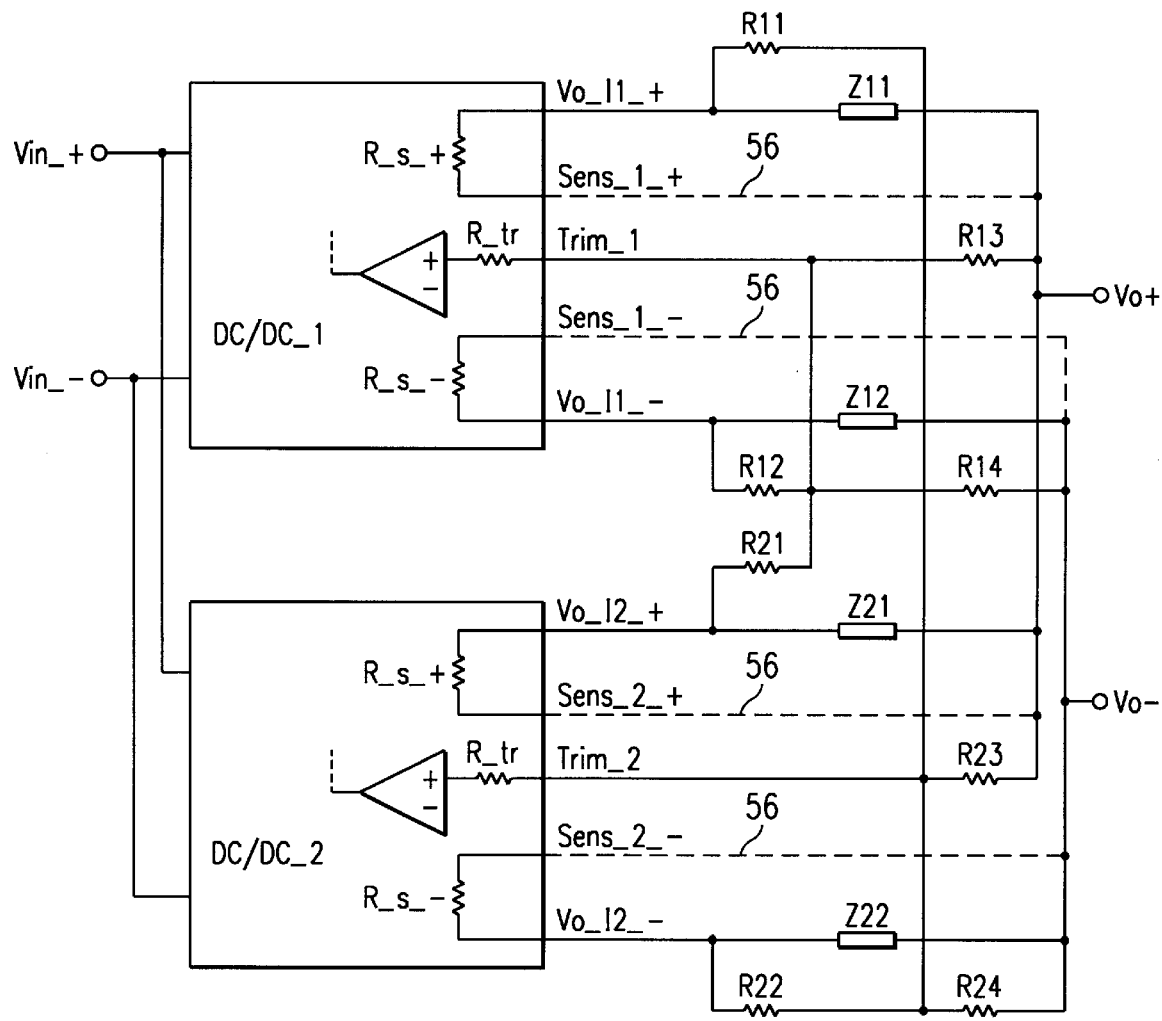
FIG. 11 shows an embodiment of the present invention having virtual remote sense connections.
Figure 12:
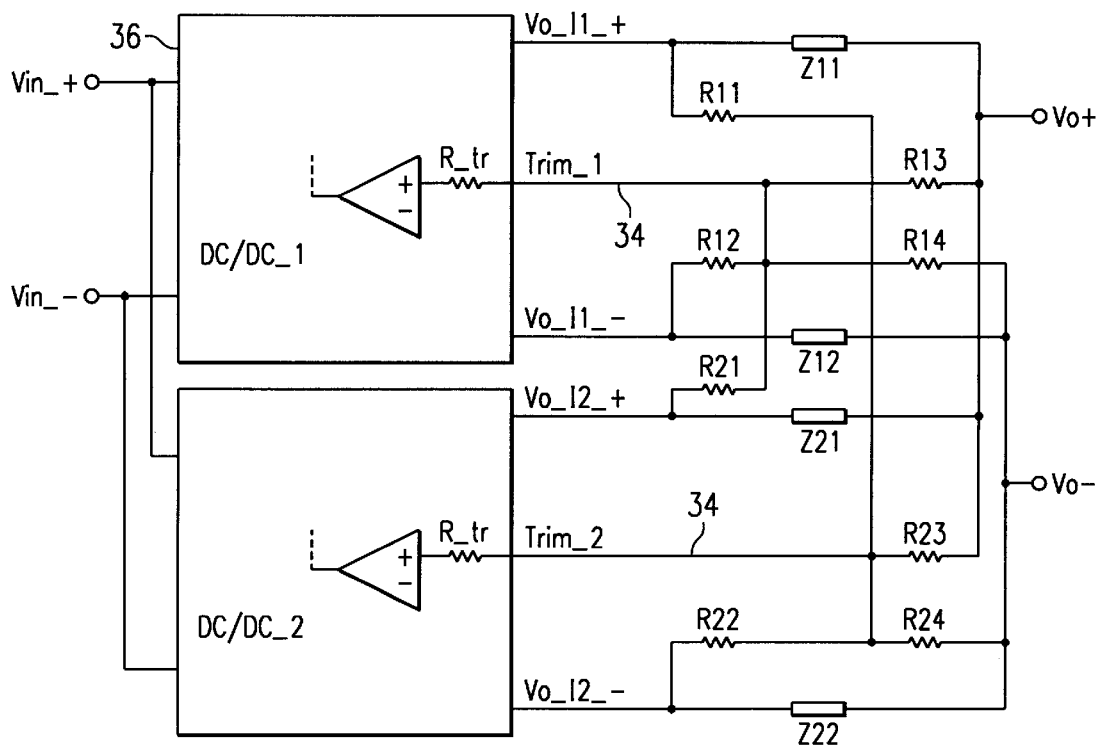
FIG. 12 is an embodiment of the present invention having two modules without remote sense connections.

In yet another embodiment of the present invention, the voltage sense terminals 22 can be virtual terminals as shown in FIG. 11. Then the voltage sense terminal 22, represented in the embodiment as sense pins 56, are removed as shown in FIG. 12. In FIG. 12, the resistor combination R11, R24 and R21, R14 inject a positive voltage into the trim terminal 24 of their respective modules 36 and 38 as the load current of the second module 38 increases. These signals improve the current sharing ability of the system and at the same time can be used to correct the amount of droop in the system voltage.

Figure 13:
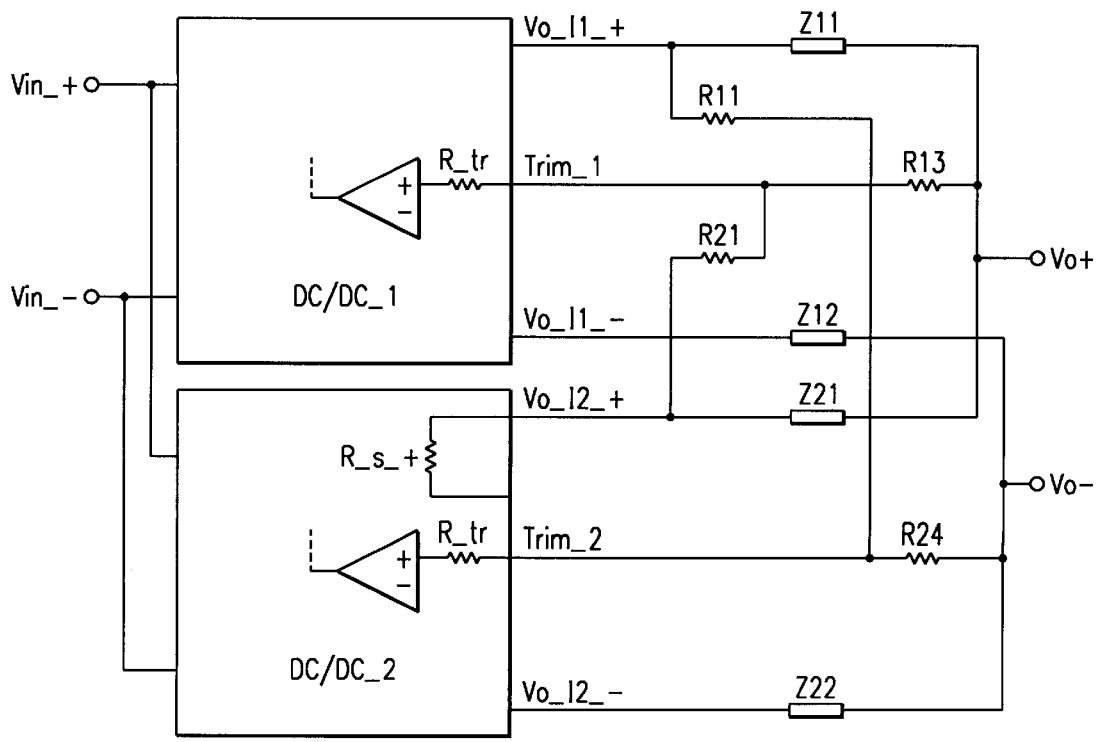
FIG. 13 is a simplified two-module embodiment of the present invention.

The resistor combinations R13, R12 and R23, R22 inject a negative signal into the trim terminal 24 of their respective module as its load current increases. Again, this signal increases the current share ability of the system. These signals also increase the droop on the system. Since a system without voltage sense terminals 22 has some natural droop of the system voltage, these combinations of resistors might not be needed as shown in FIG. 13. These resistors can be added when additional droop is required to improve the current share accuracy of the system. Unfortunately, when the voltage sense terminals 22 are removed from the system, the relationship, between the positive and negative signals injected into the respective trim terminal 24 become obscured. Therefore, the value of the different resistors would have to be determined experimentally. However, the ratio between R11 and R24, R21 and R14, R13 and R12, and R23 and R22 still needs to maintain the initial set point.

The novel system of the present simplified current share circuit provides the advantage of efficiently providing current sharing while being cost effective and less complex than the prior art current sharing schemes. A further advantage of the present invention is the ability to adapt the scheme for two or three modules. Another advantage of the present invention is that it can be implemented in existing DC-to-DC power modules which do not contain internal current sharing capabilities.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. For example, the above discussion assumes that if the output voltage of the power module needs to be adjusted up, the trim pin is forced high and if the output voltage needs to be adjusted low the trim pin is forced low. This technique can be modified to accommodate different trim functions.

What is claimed:

1. A current sharing circuit comprising:

first and second board mounted power modules, each of said power modules including an input side and an output side, said power modules coupled to each other via respective input sides, each of said output sides including a positive terminal and a negative terminal, said first and second power modules further comprising a first and second trim terminal, respectively;

first and second circuit output voltage terminals;

first and second set point controls coupled to said negative terminal of each of said output sides; and a first and second initial set point controls providing current signal paths between corresponding first and second set point controls and said first circuit output voltage terminal;

whereby said first and second set point controls and said first and second initial set point controls are configured to allow current sharing through said first and second circuit output voltage terminals when a current signal is applied to said input side of said first and second power modules, and whereby said first set point control is coupled between said first circuit output voltage terminal and said first trim terminal, the voltage of said first power module adapted to follow the voltage across said first circuit output voltage terminal and resulting in said first and second power modules current sharing.

2. The current sharing circuit according to in claim 1 wherein said first initial set point control is coupled between said first trim terminal and said positive terminal of said first circuit output voltage terminal, whereby said first initial set point of said first power module is not changed.

3. The current sharing circuit according to in claim 1 wherein said second set point control is coupled between said second output voltage terminal and said second trim terminal, whereby the voltage of said second power module is adapted to follow the voltage across said second circuit output voltage terminal and result in said first and second power modules current sharing.

4. The current sharing circuit according to in claim 1 wherein said second initial set point control is coupled between said second trim terminal and said positive terminal of said second circuit output voltage terminal, whereby said second initial set point of said second power module is not changed.

5. The current sharing circuit according to claim 1 further comprising:

a first and a second regulation terminal coupled to said first power module; and a third and a fourth regulation terminal coupled to said second power module;

whereby the output voltage of said first and second power modules is regulated.

6. The current sharing circuit according to claim 5 wherein said first regulation terminal is coupled between said first trim terminal and said negative terminal of said first circuit output voltage terminal, whereby said first initial set point control of said first power module is controlled.

7. The current sharing circuit according to claim 5 wherein said second regulation terminal is coupled between said first output voltage terminal and said second trim terminal, whereby the voltage across said first output voltage terminal is controlled relative to the voltage across said first and second circuit output voltage terminals to facilitate current sharing.

8. The current sharing circuit according to claim 5 wherein said second regulation terminal is adapted to offset the DC signal generated by said first set point control and said first initial set point control.

9. The current sharing circuit according to claim 5 wherein said third regulation terminal is coupled between said second trim terminal and said negative terminal of said second circuit output voltage terminal, whereby said second initial set point control of said second power module is controlled.

10. The current sharing circuit according to claim 5 wherein said fourth regulation terminal is coupled between said second output voltage terminal and said second trim terminal whereby the voltage across said second output voltage terminal is controlled relative to the voltage across said first and second circuit output voltage terminals to facilitate current sharing.

11. The current sharing according to claim 5 wherein said fourth regulation terminal is adapted to offset the DC signal generated by said second set point control and said second initial set point control.

12. The current sharing circuit according to claim 5 wherein said first, second, third, and fourth regulation terminals are comprised of at least one resistor.

13. The current sharing circuit according to claim 1 further comprising an impedance enhancing control to correct the initial set point of a power module if the natural system impedance is not sufficient to correct the initial set point.

14. The current sharing circuit according to claim 1 further comprising:

a third board mounted power module coupled to said first and second board mounted power modules;

a third set point control coupled to said third board mounted power module; and a third initial set point control coupled to said third board mounted power module;

whereby said third board mounted power module is configured to current share with said first and second board mounted power modules.

15. The current sharing circuit according to claim 1 wherein said first board mounted power module comprises:

a first DC-to-DC converter;

a first module input and a first output terminal coupled to said first DC-to-DC converter;

a first voltage sense terminal coupled to said first DC-to-DC converter;

a first trim terminal coupled to said first DC-to-DC converter and configured to adjust the amplitude of signals at said first output terminal;

wherein said first voltage sense terminal is further configured to deliver information about the load driver to said first trim terminal which, in turn, adjusts the amplitude of signals at said first output terminal.

16. The current sharing circuit as claimed in claim 1 wherein said second board mounted power module comprises:

a second DC-to-DC converter;

a second module input and a second output terminal coupled to said second DC-to-DC converter, said second input terminal coupled to said first input terminal;

a second voltage sense terminal coupled to said second DC-to-DC converter; and a second trim terminal coupled to said second DC-to-DC converter and configured to adjust the amplitude of signals at said second output terminal;

wherein said second voltage sense terminal is further configured to deliver information about the load driver to said second trim terminal which, in turn, adjusts the amplitude of signals at said second output terminal.

17. The current sharing circuit according to claim 16 further comprising a fifth regulation terminal coupled to said third board mounted power module.

* * * * *